D. R. HARDER.
ROTARY ENGINE.
No. 186,342. Patented Jan. 16, 1877.
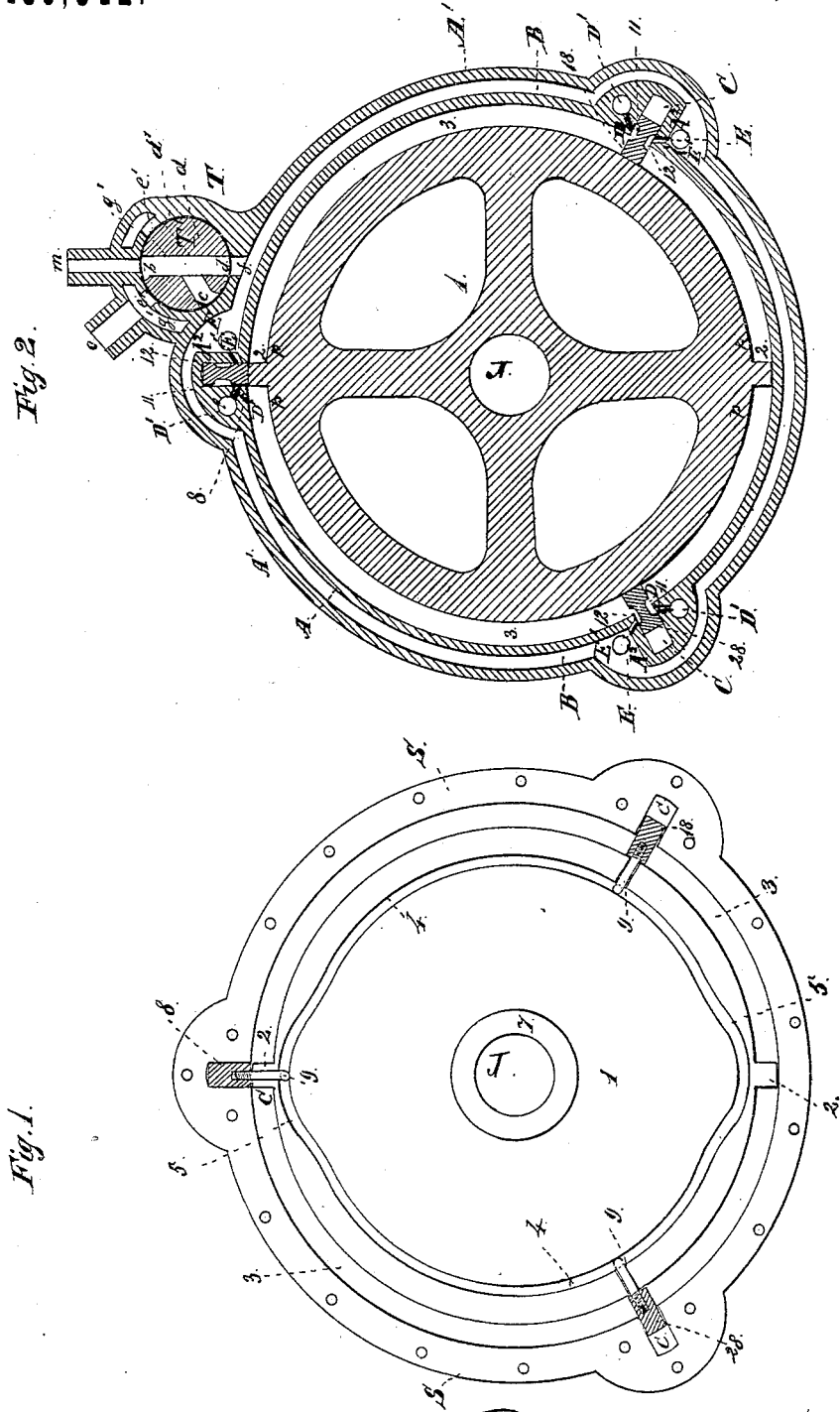
Witnesses:
Alfred H. Gordon
Henry F. Vallette
Inventor:
Dennis R. Harder D. R. HARDER.
ROTARY ENGINE.
No. 186,342.
Patented Jan. 16, 1877.
5 Sheets—Sheet 2
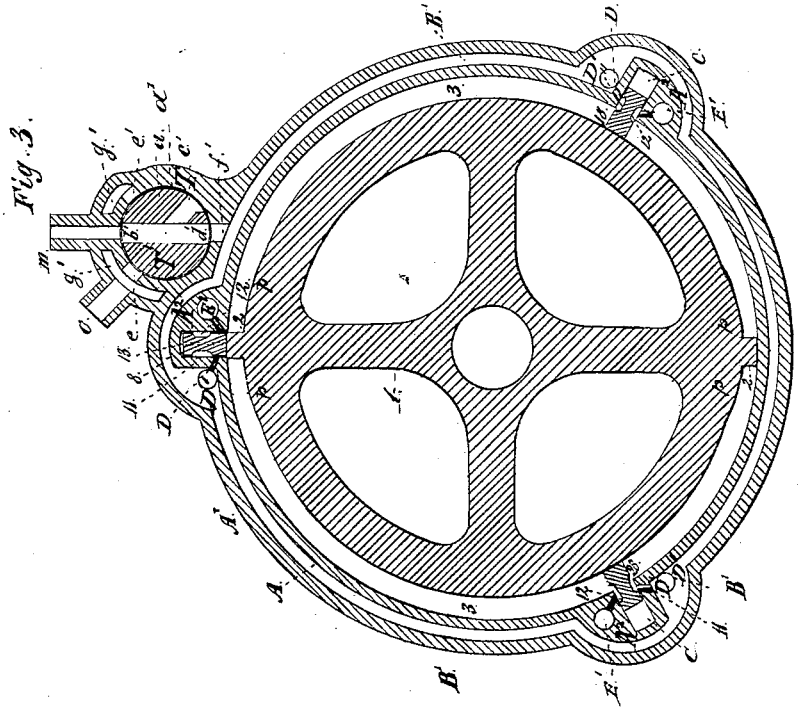
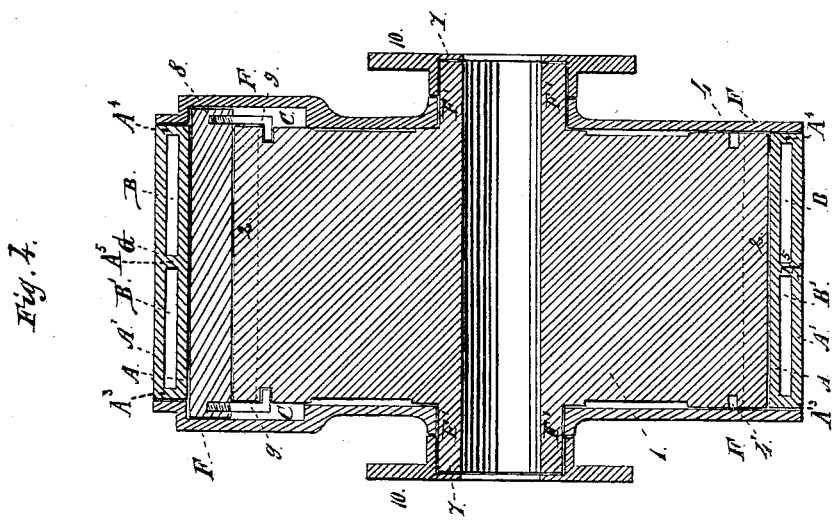
Witnesses:
Inventor:

5 Sheets—Sheet 3.
D. R. HARDER.
ROTARY ENGINE.
No. 186,342. Patented Jan. 16, 1877.
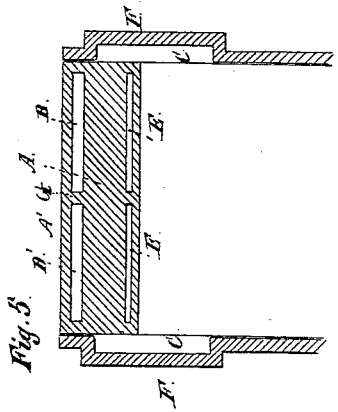
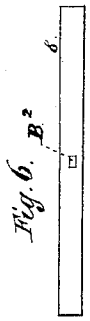
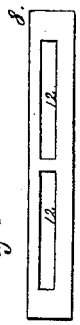
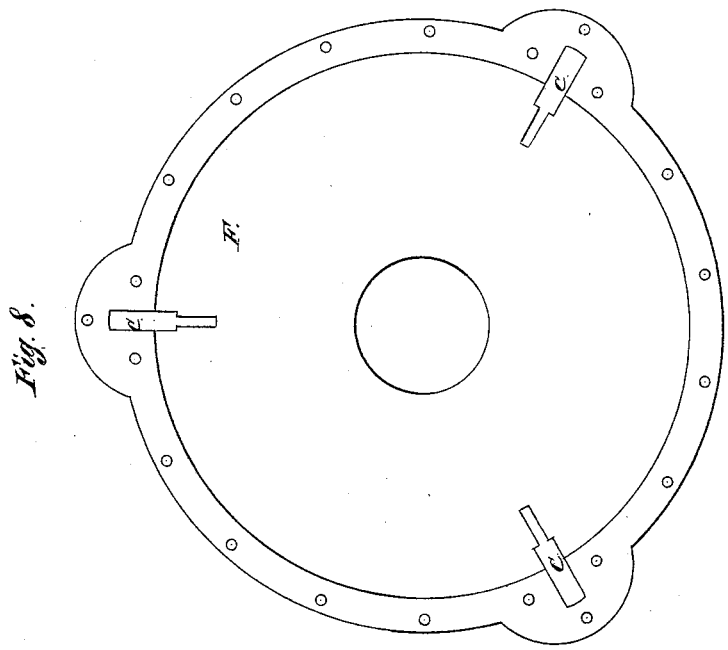
Witnesses:
Inventor:
Dennis R. Harder.

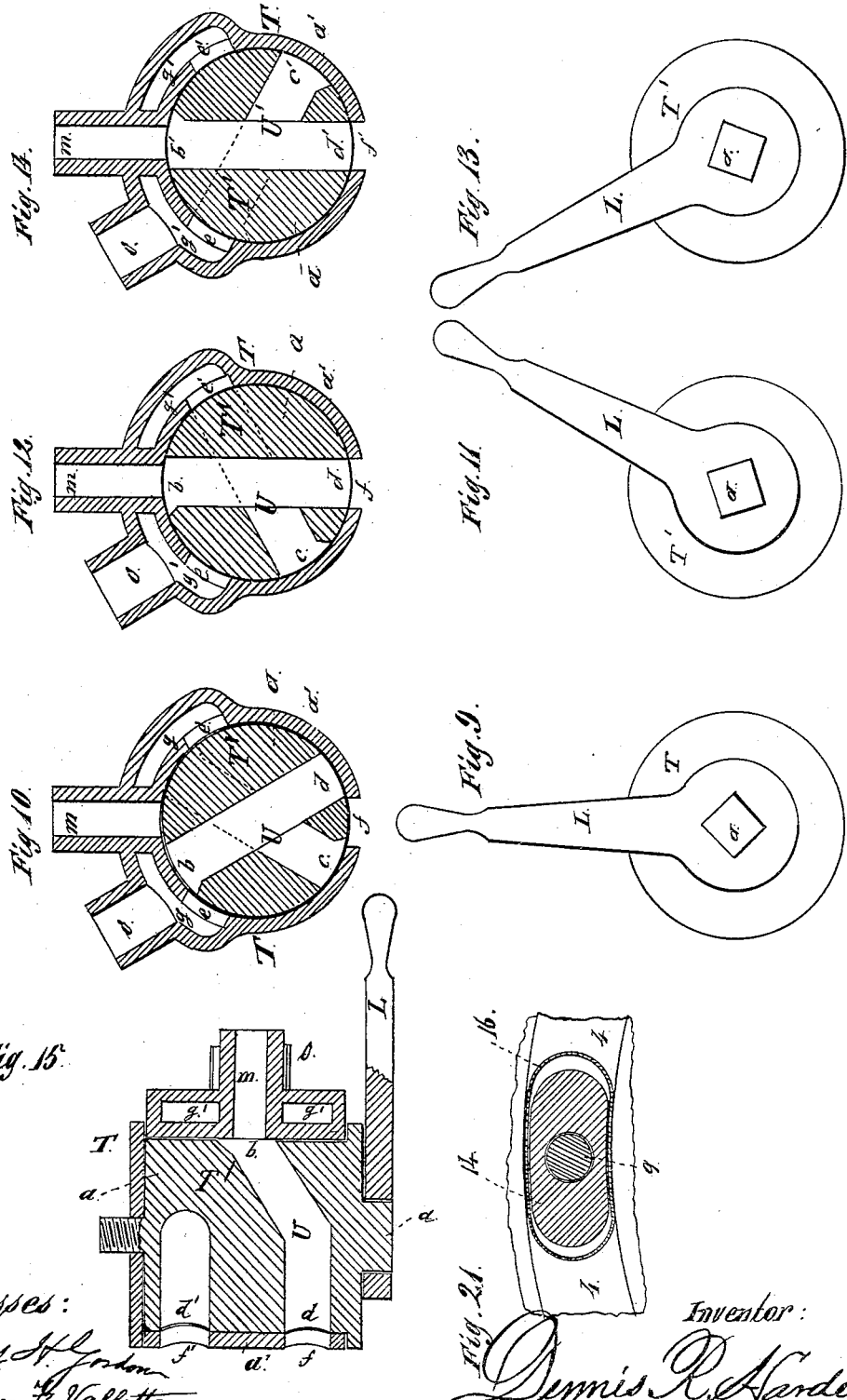

D. R. HARDER.
ROTARY ENGINE.

No. 186,342.  Patented Jan. 16, 1877.

Witnesses:
Alfred H. Gordon
Henry F. Vallette

Inventor:
D. R. Harder

UNITED STATES PATENT OFFICE.

DENNIS R. HARDER, OF CHICAGO, ILLINOIS.

IMPROVEMENT IN ROTARY ENGINES.

Specification forming part of Letters Patent No. 186,342, dated January 16, 1877; application filed April 25, 1876.

*To all whom it may concern:*

Be it known that I, DENNIS R. HARDER, of Chicago, in the county of Cook and State of Illinois, have invented a new and useful Improvement in Rotary Engines, which improvement is fully set forth in the following specification, reference being had to the accompanying drawings, in which—

Figure 16:
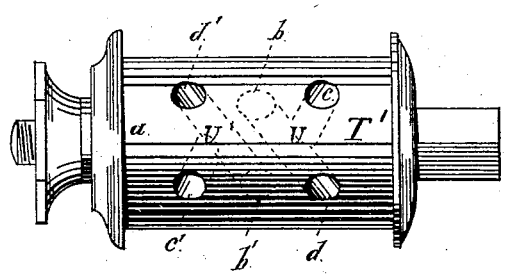
Figure 17:
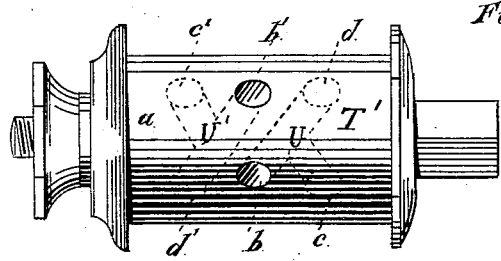
Figure 19:
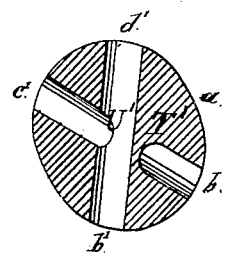
Figure 18:
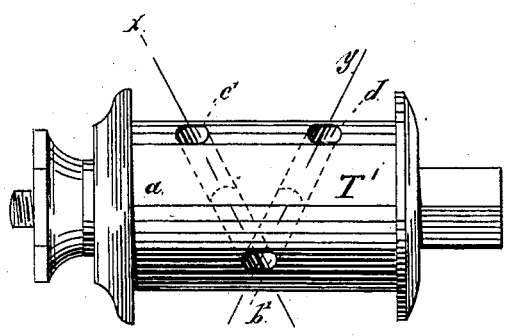
Figure 20:
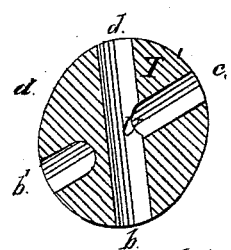

Figure 1 is an end view of the revolving piston and the shell or steam-chest of my improved rotary engine. Fig. 2 is a central cross-section of the same, showing the induction of steam in one direction. Fig. 3 is a similar cross-section, showing the engine reversed. Fig. 4 is a longitudinal central section of the same. Fig. 5 is a detailed view of one of the valve-seats, exposing the induction and exhaust ports. Fig. 6 is a top view of one of the valves or sliding rear abutments. Fig. 7 is a side view of the said valve. Fig. 8 is a side view of the cylinder in which the piston is inclosed and the valves are embedded. Fig. 9 is a front view of the starting and reversing lever. Fig. 10 is a cross-section of the cut-off and reversing valve, representing steam cut off. Figs. 11 and 13 illustrate the positions of the cut-off and reversing lever at the two stages of reversion. Figs. 12 and 14 represent the two abovesaid stages through cross-sections of the cut-off and reversing valve. Fig. 15 is a central longitudinal vertical section through the cut-off and reverse valve. Fig. 16 is a bottom view of the cut-off and reversing valve when in position, as shown in Fig. 10. Fig. 17 is a top view of the same. Fig. 18 is a side view of the same. Fig. 19 is a cross-section of Fig. 18 at the line $x\ x$. Fig. 20 is a cross-section of Fig. 18 at the line $y\ y$. Fig. 21 is an enlarged side view of a spring die or slide, whereby the movements of the valves are regulated.

The nature of my invention consists of certain constructions, combinations, and arrangements of parts, hereinafter described and specifically claimed, whereby a reversible rotary engine of very simple construction, great strength, and great motive power is produced.

The object of my invention is to so simplify the means for the induction and eduction of steam, water, or other motive medium, in connection with, and by means of, gates or sliding valves and a reversing-valve, that the power for operating the movable parts of the machine is reduced to a minimum; that, further, the slightest waste of steam or other motive medium is avoided; and that the reversion of the engine may be instantly and easily effected, at the will of the operator. Another object of my invention is to make the said rotary engine adaptable for immediate connections with all manner of running-gear or working machinery, thereby avoiding costly constructions for foundations and centering arrangements.

In the drawings, 1 represents a drum or piston, with a hollow axle, 7, to which it may be connected by arms or by the closing up of the end webs. The said piston has two or more longitudinal abutments, 2, each with two perpendicular sides, whereby the first impact of steam is received either in moving forward or backward, and whereby the crowding of steam, as in inclined abutments, is avoided. The periphery of the drum 1 is not entirely circular, but rises slightly at either side and toward the base of each abutment at $p$, for reasons hereafter explained. The inclosure of the piston consists of two steam-tight-fitting heads, F, and a concentric cylindrical case, A, which latter has, at three equidistant points of the piston, valve-seats $A^2$, for the gates or movable valves 8 18 28, which valves are snugly fitted into the said valve-seats. The case A is provided with three continuous flanging rims, $A^3$ $A^4$ $A^5$, of which $A^3$ $A^4$ are at the two ends, and $A^5$ in the middle, of the case A. An outside cover, $A^1$, is firmly fastened upon the said rims, forming therewith two parallel continuous annular chambers, B $B^1$, which serve as the steam-chest proper, and are constantly filled with steam, the one with live steam and the other with exhaust steam, or vice versa, whereby the machine is kept in a uniform state of temperature.

In practice, the shell, consisting of the case A and cover $A^1$, is cast in one piece. The valves that play in the valve-seats $A^2$ are provided with depressions 11 12 on each side, which, in connection with lateral ports D E at each side of the valve-seats, make the said valves regular induction and eduction valves.

The ports D E extend across the width of the piston 1, and are connected in such manner with the annular steamways B B¹ that all the ports opening at the same side of the valves open also into the same steamway. Consequently one steamway may be made to supply steam to the right side of each valve and the other steamway to the left side. The extension of each port beyond the middle rim is tunneled out of the metal of the valve-seat and communicates with the proper steamway by means of a hole, D' or E', drilled through the center rim, whereby it is prevented from communicating with the wrong steamway. The The valves 8 18 28 are of like construction, and extend beyond either side of the piston into chambers C in the heads F, where the said extensions are provided with rods $g$, which end in hooks wherewith they travel in a groove, 4, one of which is in either side of the piston 1. The valves, by being extended into chambers C beyond the ends of the piston, are guided widthwise very accurately, but are not restrained from expanding and contracting lengthwise, and therefore are not liable to bind. The said grooves 4 are circular and concentric with the axis of the machine, except opposite the abutments, where they bulge out in the shape of cams 5, for the purpose of lifting the valves over the said abutments.

To prevent excessive wear between the hooks of the rods $g$ and the grooves 4 I use a die, 14, surrounded by an oval spring, 16, which latter is fitted into the groove 4, and, by means of its great surface and its shape, secures a uniform and easy passage around the said groove. The hooks of the said rods $g$ are inserted into the said dies, so as to allow a slight swinging motion.

To prevent the steam from bearing against the lower sides of the valves 8 18 28, and creating unnecessary friction in the grooves 4, the said valves are provided with vertical holes B², which admit the steam to the upper side of the valve in the valve-seat, and thereby balance the valve in a radial direction. The depressions 11 12 on the valves 8 18 28 are so constructed that when the valves are bearing upon the piston 1 they open into the space between the said piston and the case A, and into the ports D E, and when they are lifted to let the abutments pass the supply and exhaust are completely shut off. Thus there are always two of the said valves 8 18 28 open and one closed.

Steam or other motive agent is admitted through a reversing-valve, T', in a shell, T, which is fastened upon the cover A¹, and has two ports, one of which, $f$, communicates with the annular steamway B, and the other, $f'$, with the steamway B¹. The valve or core T' of the said shell is provided with two three-way channels, U U', branching in the shape of a Y, which have, in all, six branches, $b\ b'$, $c\ c'$, and $d\ d'$; $b\ c\ d$ forming one and $b'\ c'\ d'$ the other three-way channel. The said channels are so arranged that their branches terminate in pairs, the termination of those pairs being in line with the ports of the valve. Each pair of branches so arranged consists of a branch of the first and a branch of the second three-way channel, so that each three-way channel may alternately serve for induction and eduction. Diametrically opposite the said ports $f$ $f'$ is the induction-port $m$, with which the branches $b$ or $b'$ of the two three-way channels are made to communicate. The said two branches $b\ b'$ communicate also and alternately with two eduction-ports, $e\ e'$, in the shell T, and to the right and left of the induction-port $m$. The eduction or exhaust may be collected in a chamber, $g'$, from both ports $e\ e'$, to be from there conveyed off from the machine through a single outlet, $o$. The core T' is, by preference, made conical as a common brass cock, which construction has the advantage of cheapness and easy adjustability. The described construction of the two three-way channels U U' and the shell T with its ports results in the following combinations for induction or eduction: at the junction with the chambers B B¹ and their respective ports $f\ f'$ two heterogeneous pairs of branches terminate and may alternately communicate with the said ports $f\ f'$; but at the induction and eduction ports $e\ e'\ m$ of the valve-shell T two heterogeneous branches terminate and may alternately communicate with the ports $e\ m$ or $e'\ m$. Thus, by turning the core T', with the branch $b$, toward the induction-port $m$ the therewith-connected branch $d$ conducts the steam or other motive medium through the port $f$ into the chamber B, while the branch $c$ is closed, and the engine revolves to the right. The exhaust is then conducted from the chamber B¹ through the port $f'$ into the branches $d'$ and $b'$, the branch $c$ being closed, and through the exhaust-port $e'$ into the chamber $g'$, to be conveyed away through the outlet $o$. The hollow axle 7 has its bearings F' in the heads F of the inclosure, and it has attached to either end a face-plate, 10, so that the hubs of the said face-plates form a steam-joint with the ends of said bearings F'. The said face-plates 10 serve for making connections with running machinery, their hubs being properly fastened by screws or otherwise to the axle 7.

Operation: The hand-lever L is in a central position between its extreme positions right and left, whereby all the branches of the two threeway channels U U' are closed and the machine is inactive. If the machine is to revolve to the right, the lever L is turned to the right, as seen in Fig. 11. Steam or other motive medium is, in the above-described manner, conducted to the chamber B, whence it enters the ports D in part directly, and in part by means of the openings D', as before stated. According to Figs. 2 and 5 of the drawings, the valve 8 is elevated by one of the cams 5, and its ports are closed. The valves 18 and 28 are bearing upon the cylindrical surface of the piston 1, and are both active. The live steam passing through the port E and the depression 12 of the valve 18 enters the steam-cylinder formed by the case A and the heads F, and forces the abutment 2 toward the valve 28, which permits the steam behind the said abutment to pass through the depression 11, and thence through the port D into the chamber $B^1$, whence it is conducted through the branch $d'$ of the three-way channel $U'$, into the chamber $g'$ and through the outlet $o$. The steam passing through the port E and the depression 12 of the valve 28 propels the other abutment 2, which is just passing under the valve 8 toward the valve 18, while the valve 18 exhausts the steam on the other side of the said abutment. When one of the abutments 2 comes near one of the said valves, it is elevated by means of one of the cams 5 sufficiently to let the abutment pass; its respective ports are thereby closed, the next valve continues the exhaust of the said valve, and the steam from the preceding valve continues to propel it. After the said abutment has traveled a small distance farther, the cam 5 moves the elevated valve down upon the circumference of the piston, and the said abutment is propelled by the steam induced through it. At the time the said valve touches the piston, the preceding valve becomes elevated by the other cam 5, and it becomes inactive, and operates in the same manner as above described. As the valves become elevated, they still bear upon the rising circumference $p$ of the piston, until both depressions 11 12 are closed, when the now inactive valve leaves the piston. When the valves descend again, they begin to bear upon the piston by means of the rise $p$ in its circumference just before the depressions 11 12 become opened.

This operation of the valves has many great advantages. In the first place all corners and sudden or steep inclinations in the operating groove 4 are avoided, and the valves 8 18 28 therefore work without jerks or noise, and without heavy strain upon their bearings. Secondly, there is absolutely no waste of steam or other motive medium, because induction and eduction from the same valve begins only after there is a perfect separation of one from the other by the contact of the valve with the piston; when the induction and eduction of one valve is stopped the separation of the valve from the piston follows.

The described operation of the valves enables me to work my machine with an unvariable pressure—that is to say, both abutments are constantly propelled by live steam, as the inactivity of one valve is instantaneously followed by the supply from the preceding and the exhaust of the following valve. The impact of live steam from the following valve is not perceptible, as the said following valve only continues the unfinished labor of the preceding valve; the machine is, therefore, free from all thumping indications of the movements of the valves. The overpressure of the live steam upon the steam sides of the valves forces them against their seats on the exhaust side, and thereby makes them steam-tight, and the bearing of the cams 5 upon the rods $g$, being in the opposite direction of the pressure of the live steam upon the valves connected therewith, serves to partly counteract the said pressure of the live steam, and relieve the friction between valve and valve-seat.

The machine can be easily connected with other machinery, as the hollow axle 7 admits of the insertion of a shaft of very large diameter, while the face-plates 10 serve for fastening-levers, clutches, wheels, and similar devices, so that a shaft to be driven need not fit the bore of the axle, and might also pass entirely through the machine. Wheels and other connecting means are fastened directly to the face-plates 7, and do not require extra shafting.

The machine with its outfit takes very little room. It requires no fly-wheel, because it works continually with equal pressure, and it does not require a very strong and ponderous foundation, as it is not subjected to jerks and thumps from irregular action of the parts caused by irregularities in the motive power. If the piston 1 is driven by outside power, my rotary engine can be converted into a rotary pump.

Under my construction all the operating parts of the engine are inclosed within the case, and are not in any way exposed, and all packing for outside connections is avoided.

I am aware that there are rotary engines parts of which show a construction similar to that of my invention; but such engines lack either in arrangement or combination of parts, so that their operation is not as perfect as is required. In my machine each valve operates—i. e., supplies steam on one side and exhausts steam on the other side until it leaves the surface of the revolving piston. As soon as one valve leaves the surface of the piston, and it therefore becomes inactive, its own supply-steam and that of the preceding valve unite, and continue to propel the abutment without change of pressure, which the exhaust steam of the above-mentioned inactive valve commingles with the exhaust steam of the succeeding valve, and is exhausted thereby.

In other rotary engines of the same class the supply-steam is entirely closed until the raised valve or gate touches the surface of the piston again, or until the abutment has passed the thickness of the valve, or until the thickness of metal between the port of the valve and its bottom has been moved into the steam room or cylinder; and there is no rotary engine in which the raising of the gates is not connected with a temporary interruption of supply, and consequently a variation of pressure upon the abutment, so far as I am aware.

Having described my invention, what I claim as new, and desire to secure by Letters Patent, is—

1. In a rotary engine the revolving piston 1, having a hollow axle, 7, and face-plates 10, substantially as and for the purpose specified.

2. In a rotary engine, the cylindrical cover A, valve-chests $A^2$, having the ports D E, extending their whole length, and two chambers, B $B^1$, for induction and eduction, substantially as set forth.

3. The combination of the pin $g$, the die 14, the spring 16, and the groove 4, constructed and operating substantially as set forth.

4. The valve-seat T, having ports $m\ e\ e'$ and $f f'$, and the valve or core T', having two three-way channels, U U', constructed and operating substantially as set forth.

5. The combination of the chamber $g'$ and outlet $o$ with the valve shell or seat T and the valve or core T', substantially as and for the purpose described.

6. In the cover A, provided with chambers B $B^1$, the ports D E, extending across the whole breadth of the piston 1, and the channels D' E', substantially as set forth.

7. In a rotary engine, the combination of the valve-chest $A^2$, ports D E, and the valve 8, having depressed ports 11 12, and a steam-passage, $B^2$, all constructed and arranged to supply, exhaust, cut off steam, and balance the valve, substantially as set forth.

8. The combination of the valves 8, 18, 28, having side ports, the passages B $B^1$, and the channels D' E', the piston 1, having cam-grooves 4, abutments 2, and eccentric surfaces $p$, all constructed and arranged to secure an uninterrupted supply of live steam to both abutments, and also to secure an uninterrupted passage for the exhaust steam, substantially as set forth.

DENNIS R. HARDER.

Witnesses:
ALFRED H. GORDON,
HENRY F. VALLETTE.